United States Patent
McCoy et al.

(10) Patent No.: US 7,367,185 B1
(45) Date of Patent: May 6, 2008

(54) ZERO TURN DRIVE APPARATUS WITH POWER TAKE OFF

(75) Inventors: K. Mike McCoy, Sullivan, IL (US); Lonnie E. Holder, Sullivan, IL (US); Scott W. Keller, Charleston, IL (US)

(73) Assignee: Hydro-Gear Limited Partnership, Sullivan, IL (US)

( * ) Notice: Subject to any disclaimer, the term of this patent is extended or adjusted under 35 U.S.C. 154(b) by 0 days.

(21) Appl. No.: 11/561,217

(22) Filed: Nov. 17, 2006

Related U.S. Application Data

(63) Continuation of application No. 11/068,702, filed on Feb. 28, 2005, now Pat. No. 7,137,250.

(60) Provisional application No. 60/551,611, filed on Mar. 8, 2004.

(51) Int. Cl.
*F04B 23/04* (2006.01)
*B60K 17/10* (2006.01)

(52) U.S. Cl. ............................. 60/486; 60/487; 60/488

(58) Field of Classification Search ................. 60/487, 60/488, 486
See application file for complete search history.

(56) References Cited

U.S. PATENT DOCUMENTS

| | | |
|---|---|---|
| 2,875,701 A | 3/1959 | Ebert |
| 2,914,219 A | 11/1959 | Chlantelassa |
| 3,367,105 A | 2/1968 | Dowty |
| 3,486,335 A | 12/1969 | Kern et al. |
| 4,252,508 A | 2/1981 | Forster |
| 4,270,408 A | 6/1981 | Wagner |
| 4,819,508 A | 4/1989 | Yamaoka et al. |
| 4,893,524 A | 1/1990 | Ohashi et al. |
| 4,971,535 A | 11/1990 | Okada et al. |
| 5,040,429 A | 8/1991 | Del Castillo |
| 5,078,222 A | 1/1992 | Hauser et al. |
| 5,207,060 A | 5/1993 | Sheets |
| 5,304,043 A | 4/1994 | Shilling |

(Continued)

FOREIGN PATENT DOCUMENTS

EP 1473183 A2 3/2004

(Continued)

OTHER PUBLICATIONS

Dixie Chopper, Operation Manual 1998, Cover Page and pp. 50-51, 60-61, 66, Revision #5 Feb. 1998.

*Primary Examiner*—Thomas E. Lazo
(74) *Attorney, Agent, or Firm*—Neal, Gerber & Eisenberg LLP

(57) ABSTRACT

An embodiment of the present invention involves a zero turn drive apparatus. The zero turn drive apparatus has a housing, which has a first and a second end. The housing has a first end cap mounted on the first end of the housing, and a second end cap mounted on the second end of the housing. A hydraulic pump is rotatably mounted on each end cap, and each hydraulic pump is driven by a pump input shaft. A gear chamber is interposed between each pump. A power take off mechanism is engaged to the housing, and an output shaft extends from the power take off mechanism. An input shaft, which is engaged to each of the pump input shafts, extends into the power take off mechanism and is selectively engaged to the output shaft.

21 Claims, 7 Drawing Sheets

U.S. PATENT DOCUMENTS

| | | |
|---|---|---|
| 5,501,578 A | 3/1996 | Skirde |
| 5,542,307 A | 8/1996 | Hasegawa et al. |
| 5,800,134 A | 9/1998 | Hasegawa et al. |
| 6,199,380 B1 | 3/2001 | Ishii |
| 6,301,885 B1 | 10/2001 | Johnson et al. |
| 6,332,393 B1 | 12/2001 | Trimble |
| 6,361,282 B1 | 3/2002 | Wanschura |
| 6,363,815 B1 | 4/2002 | Ishimaru et al. |
| 6,382,339 B1 | 5/2002 | Nemoto |
| 6,425,244 B1 | 7/2002 | Ohashi et al. |
| 6,457,560 B1 | 10/2002 | Evans et al. |
| 6,487,856 B1 | 12/2002 | Ohashi et al. |
| 6,494,686 B1 | 12/2002 | Ward |
| 6,672,058 B1 | 1/2004 | Langenfeld et al. |
| 6,672,843 B1 | 1/2004 | Holder et al. |
| 6,705,840 B1 * | 3/2004 | Hauser et al. .............. 417/205 |
| 6,736,605 B2 | 5/2004 | Ohashi et al. |
| 6,877,302 B2 | 4/2005 | Samejima et al. |
| 6,953,327 B1 | 10/2005 | Hauser et al. |
| 6,960,069 B2 | 11/2005 | Maruta et al. |
| 6,971,233 B1 | 12/2005 | Holder |
| 6,973,783 B1 | 12/2005 | Hauser et al. |
| 6,988,580 B2 * | 1/2006 | Ohashi et al. .............. 180/307 |
| 7,028,472 B2 | 4/2006 | Ohashi et al. |
| 2004/0200657 A1 | 10/2004 | Stoll et al. |
| 2004/0237490 A1 | 12/2004 | Yasuda et al. |
| 2005/0016304 A1 | 1/2005 | Ishii et al. |

FOREIGN PATENT DOCUMENTS

| | | |
|---|---|---|
| JP | 2000009023 | 11/2000 |
| JP | 2001-146951 | 5/2001 |
| JP | 2001-263259 | 9/2001 |
| WO | WO99/67532 | 12/1999 |

* cited by examiner

ZERO TURN DRIVE APPARATUS WITH POWER TAKE OFF

This application is a continuation of U.S. patent application Ser. No. 11/068,702 filed on Feb. 28, 2005, which claims the benefit of U.S. Provisional Patent Application Ser. No. 60/551,611, both of which are incorporated herein by reference in their entirety.

BACKGROUND OF THE INVENTION

This invention relates to hydraulic pump assemblies.

SUMMARY OF THE INVENTION

A zero turn drive apparatus comprising dual tandem pumps with a hydraulic power take off is disclosed herein. The details of this invention are set forth below in connection with the detailed description of the embodiments.

DETAILED DESCRIPTION OF THE DRAWINGS

Figure 1:
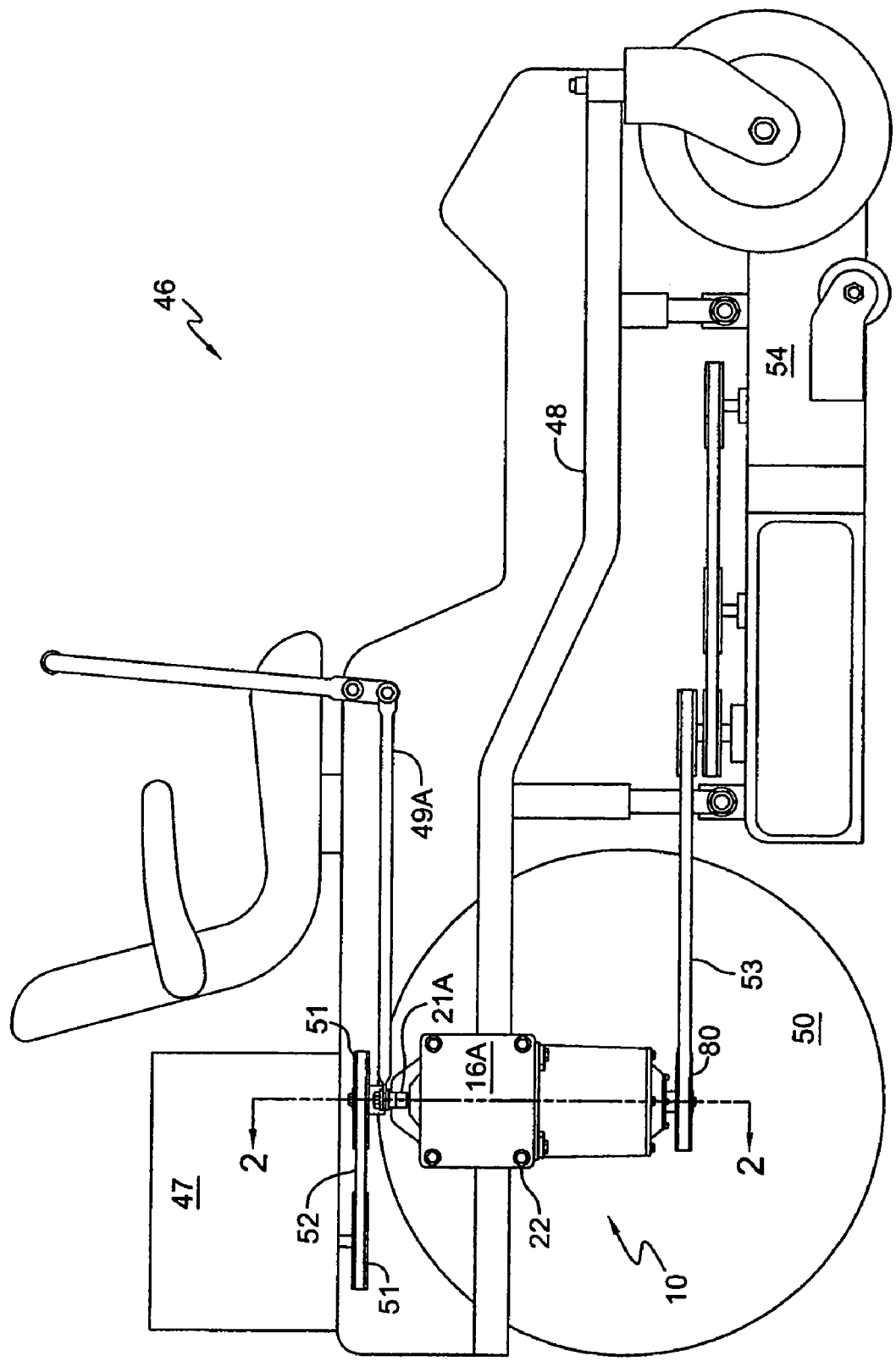
FIG. 1 is a vehicle employing a first embodiment of the drive assembly of the present invention.

FIG. 1 depicts an exemplary vehicle 46 having a frame 48 on which pump apparatus 10 is mounted. Engine 47 is mounted to frame 48 and is coupled to pump apparatus 10 by means of belt 52. Apparatus 10 is likewise coupled to deck 54 by belt 53. Linkage 49A is connected to and actuates trunnion arm 21A, which is described in detail below. It will be understood by one of skill in the art that FIG. 1 depicts an exemplary embodiment rather than a limiting one. Apparatus 10 has many applications and is not limited to applications such as vehicle 46, nor is it limited to use with vehicles as there are industrial applications for such units.

FIGS. 2, 5, 6 and 7 are similar cross-sectional views of different embodiments of this invention. It will be understood that, for convenience and clarity, certain elements of these figures are not shown in cross-sectioning. By way of example, in FIG. 2 input shaft 14, gears 35A, 35B and 36 and trunnions 21A and 21B are not shown in cross section. The internal structure of such elements is generally known in the art and cross sectioning would not assist in the understanding of the invention. Furthermore, in each of the embodiments discussed herein, identical numerals followed by "A" and "B" identify identical elements. Therefore, for convenience, the descriptions of elements with numerals followed by "A" apply equally to elements with identical numerals followed by "B." It will be understood, however, that different types of motors, pumps and center sections could be used in this invention, and that these items need not necessarily be identical on both sides of the unit. Also, subsequent embodiments with similar elements to the first embodiment add a numeral prefix to denote such elements. For example, the unitary pump apparatus housings are identified as 12, 112, 212, etc.

Figure 2:
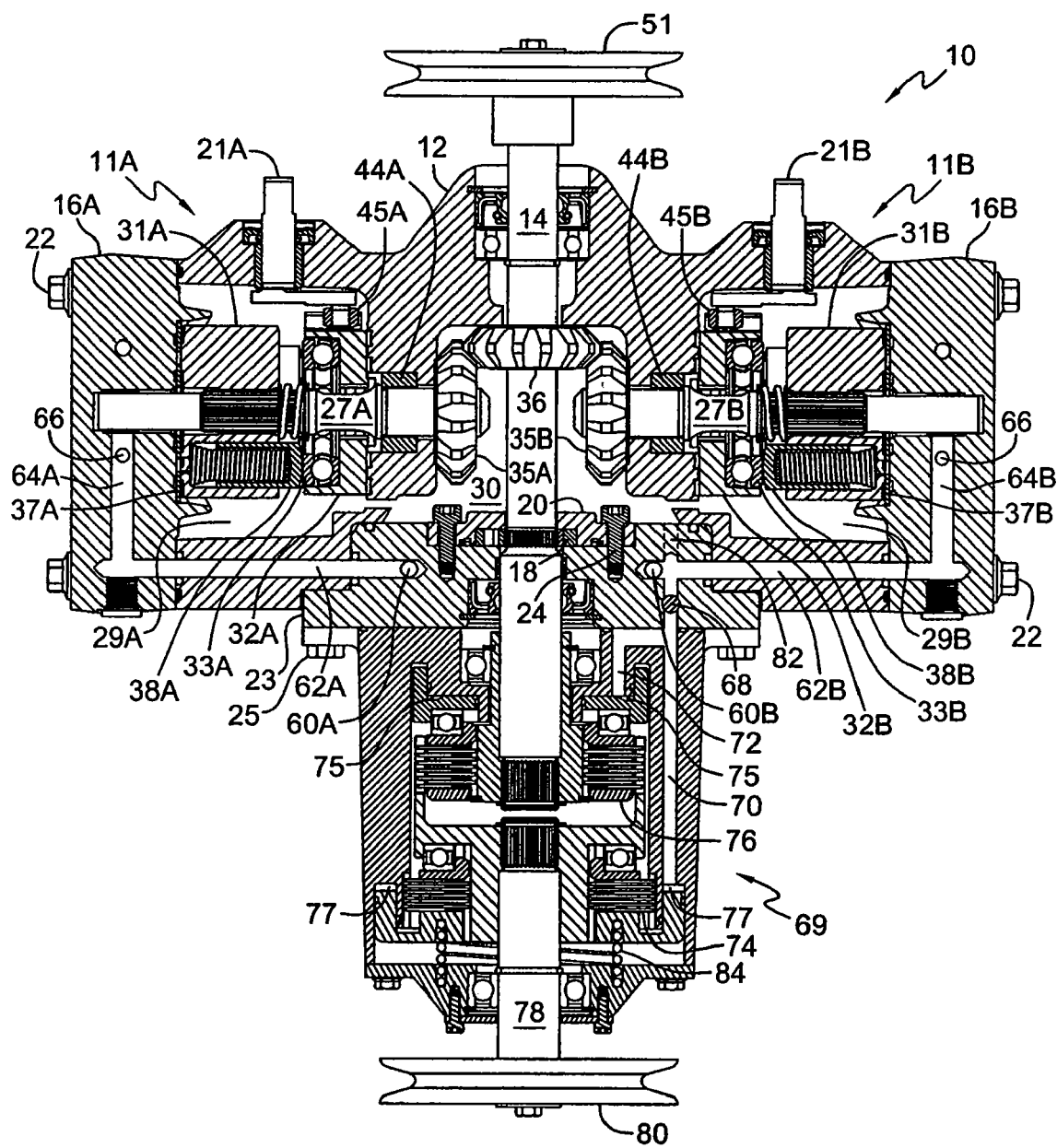
FIG. 2 is a detailed cross-sectional view of a first embodiment of the invention along the lines 2-2 as shown in FIG. 1.
Figure 3:
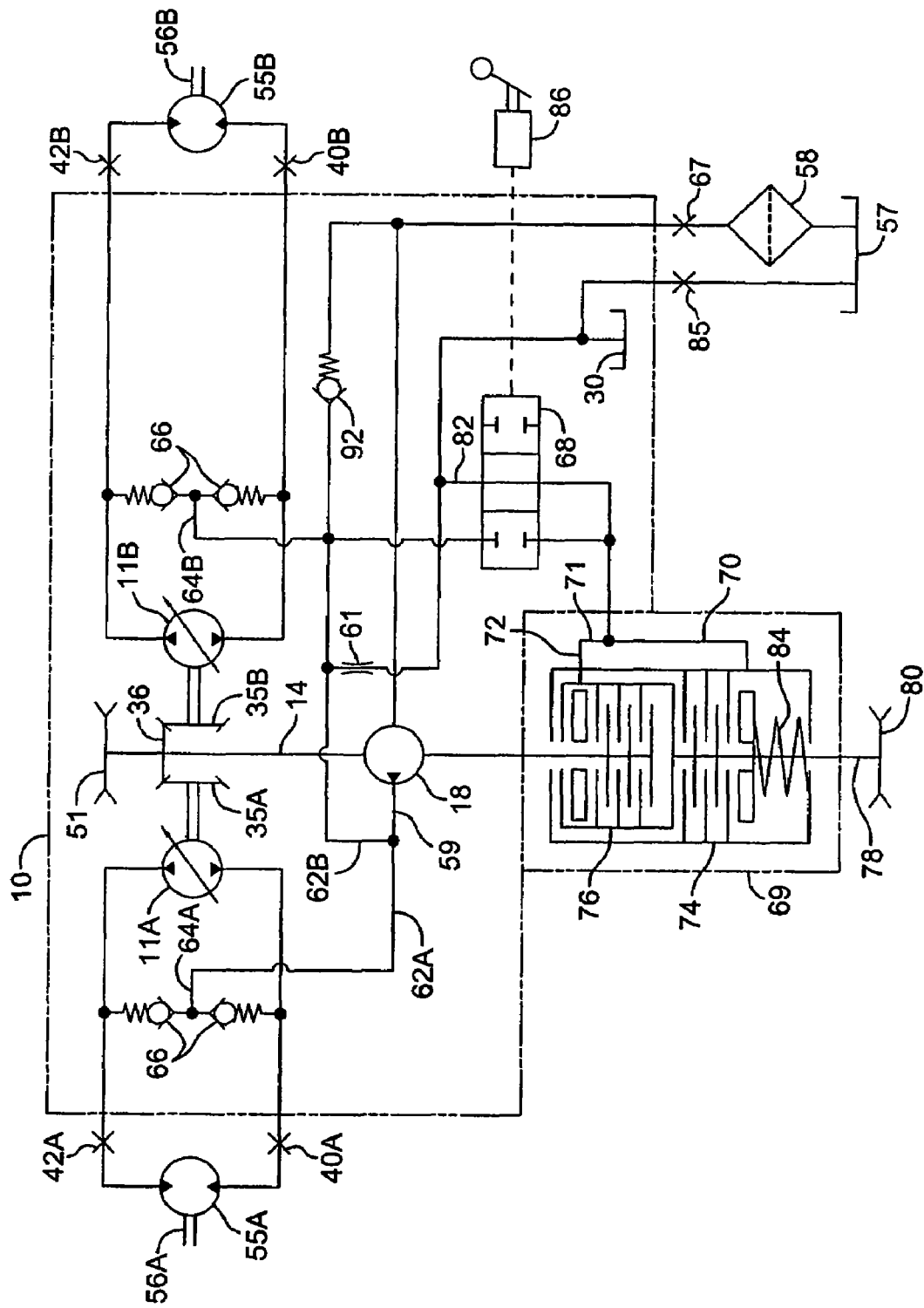
FIG. 3 is a schematic of the hydraulic circuitry of the first embodiment of the present invention.
Figure 4:
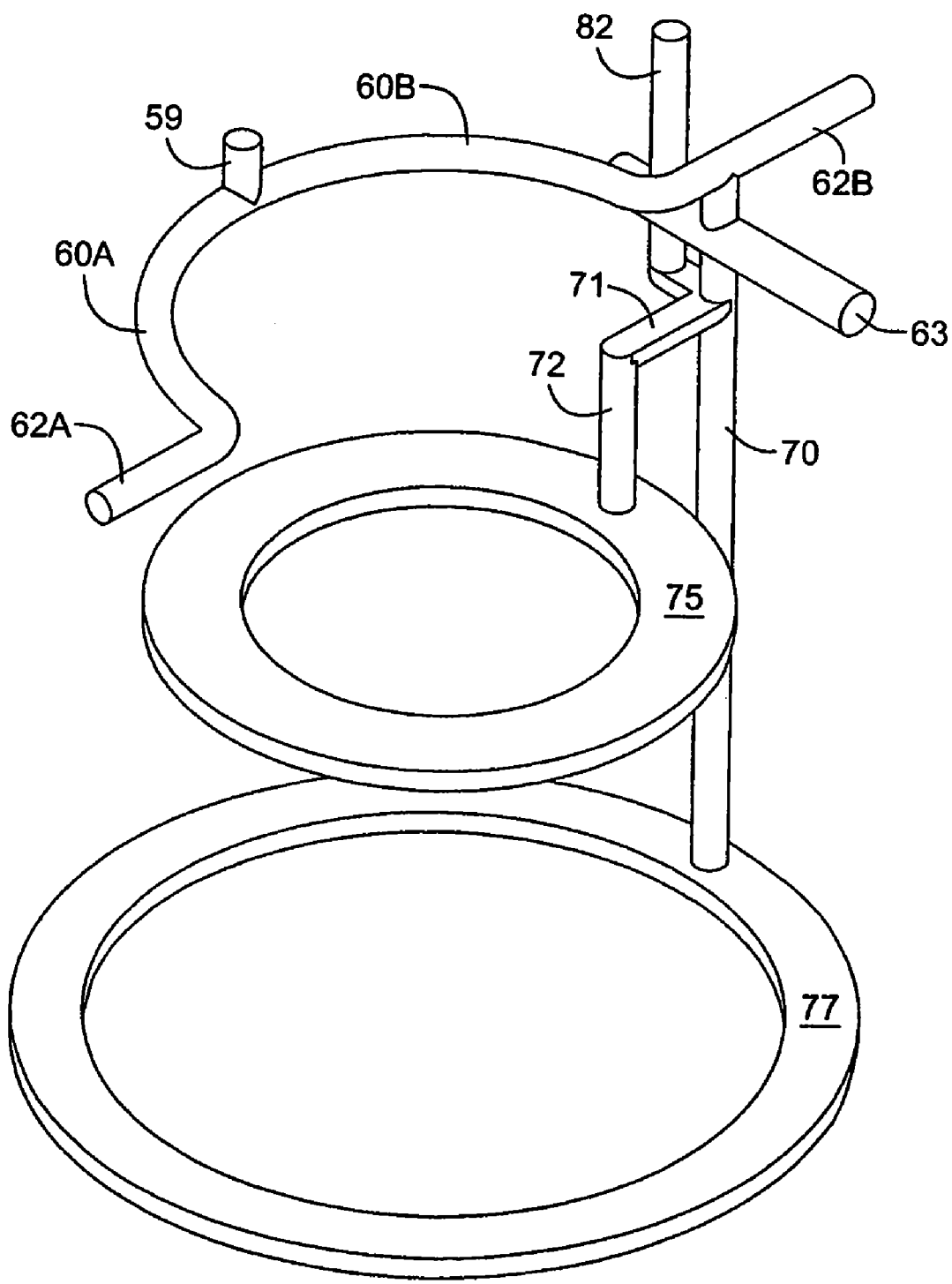
FIG. 4 is a perspective, stylized view of the fluid passages to the power take off.

FIG. 2 depicts a first embodiment of the invention along the lines 2-2 as shown in FIG. 1. In the first embodiment, pump apparatus 10 has a unitary housing 12. FIG. 3 depicts many of the elements schematically, while FIG. 4 depicts a stylized view of certain of the hydraulic porting components described herein, to show the various connections more clearly.

As will be described further below, power take off 69 is attached to cover 23 that is mounted on housing 12. Power take off 69 may be used to drive a device such as a mowing vehicle deck 54 as shown in FIG. 1 or other device while generally identical pumps 11A and 11B, located within housing 12, power other devices such as wheel motors 55A and 55B, as shown in FIG. 3, by hydraulic connection to system ports 40A and 42A located on end cap 16A and system ports 40B and 42B located on end cap 16B. Wheel motors 55A and 55B may further drive shafts 56A and 56B that may be axle shafts that further have wheels 50 mounted thereon. The configuration and operation of hydraulic pumps 11A and 11B and the associated shafts, gearing and the like is explained in more detail in U.S. Pat. No. 6,705,840, also assigned to the assignee of the present invention and incorporated herein by reference.

Pump apparatus 10 is powered by connection to a prime mover, such as a vehicle engine 47. Such connection may be directly to an output of vehicle engine 47, or, as shown, it may be by way of pulley 51 driven by belt 52 coupled to the output of vehicle engine 47. Pulley 51 is connected to input shaft 14 that extends through housing 12 and cover 23 into power take off 69. A bevel gear 36 is located on shaft 14 and is drivingly mated to bevel gears 35A and 35B, all of which are located within gear chamber 30. Bevel gear 35A is non-rotatably mounted on pump shaft 27A, which is supported within housing 12 by bearing 44A and within end cap 16A. Similarly, bevel gear 35B is non-rotatably mounted on pump shaft 27B, which is supported in housing 12 by bearing 44B and within end cap 16B. Gear chamber 30 is formed internal to housing 12 and is closed by securing cover 23 with fasteners 25 to housing 12.

Pump chambers 29A and 29B are formed by openings in housing 12 that are closed by fastening end caps 16A and 16B, respectively, to housing 12 with fasteners 22. Only the operation of hydraulic pump 11A will be described in detail, as it will be understood that the operation and configuration of hydraulic pump 11B will preferably be identical. Pump shaft 27A extends into pump chamber 29A and drives pump cylinder block 31A in which are mounted pistons 38A. Pump cylinder block 31A may rotate directly on a surface of end cap 16A, or, as depicted, may rotate on valve plate 37A, located between pump cylinder block 31A and end cap 16A. Pump pistons 38A bear against thrust bearing 33A, which is positioned within swash plate 32A. Swash plate 32A controls the displacement of fluid by pistons 38A. When swash plate 32A is generally perpendicular to pump shaft 27A, pump pistons 38A displace little or no fluid as they rotate about shaft 27A, and pump 11A is thus in neutral. As trunnion arm 21A, through its interface block 45A, moves swash plate 32A from this position, pump pistons 38A displace fluid as they rotate about shaft 27A, providing hydraulic fluid to separate hydraulic motor 56A.

As shown in FIG. 2, input shaft 14 drives charge pump 18 located on an interior surface of gear chamber cover 23.

Charge pump 18 is enclosed within charge pump housing 20, which is attached to gear chamber cover 23 with fasteners 24. Charge pump 18 is shown as a gerotor, but it could be of a variety of other types suitable for providing the pressure required to perform the various functions described herein. As input shaft 14 rotates, it drives charge pump 18, which pulls fluid from reservoir 57 through filter 58 into charge pump inlet 67 located in cover 23 and then provides pressurized hydraulic fluid via fluid supply passage 59 to fluid passages 60A and 60B, as shown in FIGS. 3 and 4. The pressurized fluid flows from fluid passages 60A and 60B to fluid passages 62A and 62B, which then guide the charged fluid to charge galleries 64A and 64B formed in end caps 16A and 16B. Charge galleries 64A and 64B provide pressurized fluid to check valves 66, which are located between charge galleries 64A and 64B and pumps 11A and 11B, respectively, and open as required to provide fluid to pumps 11A and 11B. A charge relief valve 92 as shown in FIG. 3 would normally be associated with at least one of these passages to limit the pressure in the various passages. Charge relief valve 92 could readily be located in a variety of locations, including cover 23 or one of the end caps 16A and 16B. An orifice 61 may also be associated with charge galleries 64A and 64B to drain a small amount of fluid from those galleries to help increase the amount of cooler fluid drawn from reservoir 57. Orifice 61 is sometimes called a cooling orifice.

As shown in FIGS. 2-5, power take off fluid passage 70 is connected to fluid passage 62B, power take off activation passage 75 and brake de-activation passage 77. Specifically, when valve 68 positioned in bore 63 is opened, pressurized fluid is coupled to power take off brake de-actuation passage 77 by way of fluid passage 70 and to power take off actuation passage 75 by way of cross passage 71 and fluid passage 72. When valve 68 is closed, pressurized fluid is prevented from entering fluid passage 70 from fluid passage 62B, and valve 68 allows residual pressure in fluid passages 70 and 72 and all associated passages to relieve back to gear compartment 30 through pressure relief passage 82. Excess fluid from gear compartment 30, pump chamber 29A and pump chamber 29B is returned to reservoir 57 through case drain 85 that may be located in a multitude of locations, including housing 12, cover 23, end cap 16A, or end cap 16B, though gear compartment 30 is a preferred location for case drain 85 because it minimizes the entry of wear particles from bevel gears 35A, 35B and 36 into pump chambers 29A and 29B. Valve 68 may be manually actuated or may be hydraulically or electrically actuated, the details of which are not shown because manual and remotely actuated valves are known in the art.

Power take off mechanisms, such as power take off mechanism 69, are well known in the art. Moreover, it will be appreciated by those in the art that any number of power take off mechanisms will be covered by the scope of the present invention. As such, the elements of power take off mechanism 69 will only be generally described. In the depicted embodiment, power take off mechanism 69 is positioned within power take off housing 118. Power take off input coupler 104 is splined with, and rotates at the same rate as, input shaft 14. Power take off output coupler 105 is splined with, and rotates at the same rate as, output shaft 78. Power take off clutch assembly 76 selectively couples input coupler 104 with output coupler 105. Power take off clutch assembly 76 may be any one of various well known clutches. In the depicted embodiment, power take off clutch 76 comprises various, alternating clutch rotors 121, which are coupled with input coupler 104, and clutch stators 120, which are coupled with output coupler 105. Spring washers 119 are located between each clutch stator 120 and clutch rotor 121, and bias power take off clutch assembly 76 in the unclutched position. Clutch piston 101 is positioned between clutch assembly 76 and power take off housing 118.

At the end opposite power take off clutch assembly 76, power take off output coupler 105 is selectively braked by power take off brake assembly 74. While there are a number a known braking methods, the depicted embodiment employs a method similar to power take off clutch assembly 76. Namely, power take off brake assembly 74 includes alternating brake stators 130, which are coupled with power take off housing 118, and brake rotors 131, which are coupled with output coupler 105. Brake piston 103 is positioned adjacent to brake assembly 74 and between brake assembly 74 and power take off housing 118. Brake return spring 84, in turn, is positioned between brake piston 103 and power take off housing 118. Initially, return spring 84 biases brake piston 103 toward brake assembly 74, compressing brake stators 130 and brake rotors 131 and braking output shaft 78 through output coupler 105.

Power take off output shaft 78 extends from power take off housing 118 and may either directly drive an output mechanism (not shown) or have a pulley 80 mounted thereon for the purpose of connecting output shaft 78 by means of a belt to a driven device, such as an auxiliary pump (not shown) or mowing deck 54 as shown in FIG. 1

In use, the depicted embodiment of power take off mechanism 69 operates as follows. When control 86 opens valve 68, pressurized hydraulic fluid flows through passage 70, which is formed in power take off housing 118, to annular brake de-actuation passage 77, which is formed between brake piston 103 and power take off housing 118. Pressurized hydraulic fluid in passage 77 will cause brake piston 103 to compress brake return spring 84, which will decompress brake stators 130 and brake rotors 131, unbraking output shaft 78. Concurrently, pressurized hydraulic fluid will flow into cross passage 71, which is formed at the interface between housing 118 of power take off 69 and cover 23, through passage 72 and into annular power take off actuation passage 75, which is formed between clutch piston 101 and power take off housing 118. The pressurized fluid in passage 75 will move clutch piston 101, which in turn compresses clutch stators 120 and clutch rotors 121, engaging power take off clutch assembly 76 and coupling input shaft 14 with output shaft 78 through input coupler 104 and output coupler 105, respectively.

When valve 68 is closed by actuator 86, pressurized fluid is blocked from passage 70. Valve 68 also provides a pathway to pressure relief passage 82 to release pressure from the passageways associated with brake 74 and power take off clutch 76. As pressure is released in power take off clutch 76, spring washers 119 return clutch stators 120 and clutch rotors 121 to an uncompressed position, which uncouples input shaft 14 from output shaft 78. Concurrently, return spring 84 biases brake piston 103 toward brake assembly 74, compressing brake stators 130 and brake rotors 131, thus braking output shaft 78.

Figure 5:
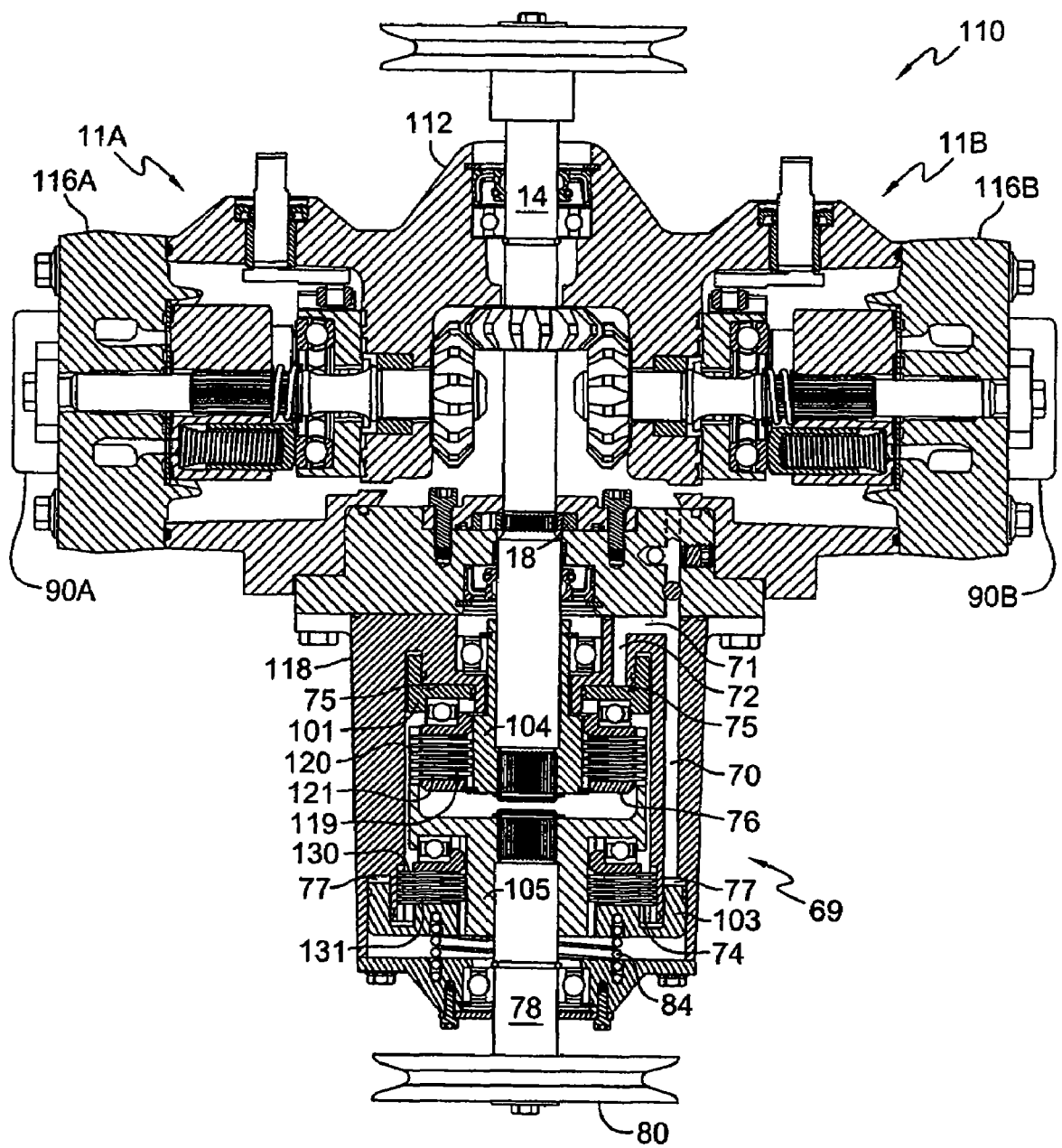
FIG. 5 is a detailed cross-sectional view of a second embodiment of the invention.

FIG. 5 is a view similar to that of FIG. 2 and depicts a second embodiment of the present invention. Because the charge pressure required for pumps 11A and 11B may be different than the desired hydraulic pressure to actuate power take off 69, pump apparatus 110 has three charge pumps 18, 90A and 90B. Charge pump 18 provides pressurized hydraulic fluid to power take off 69 only, and charge pumps 90A and 90B provide charge pressure to pumps 11A and 11B, respectively. By providing three separate charge pumps 18, 90A and 90B, the required pressure supplied by each charge pump may be more closely matched to the requirements of the circuit supplied by the associated charge pump. Having three separate charge pumps as compared to a single charge pump also reduces the complexity of passageways connecting a single charge pump 18 to end caps 16A and 16B as shown in FIGS. 2 and 4. The porting in end caps 116A and 116B that connects charge pumps 90A and 90B to pumps 11A and 11B is generally known and is not shown herein.

Figure 6:
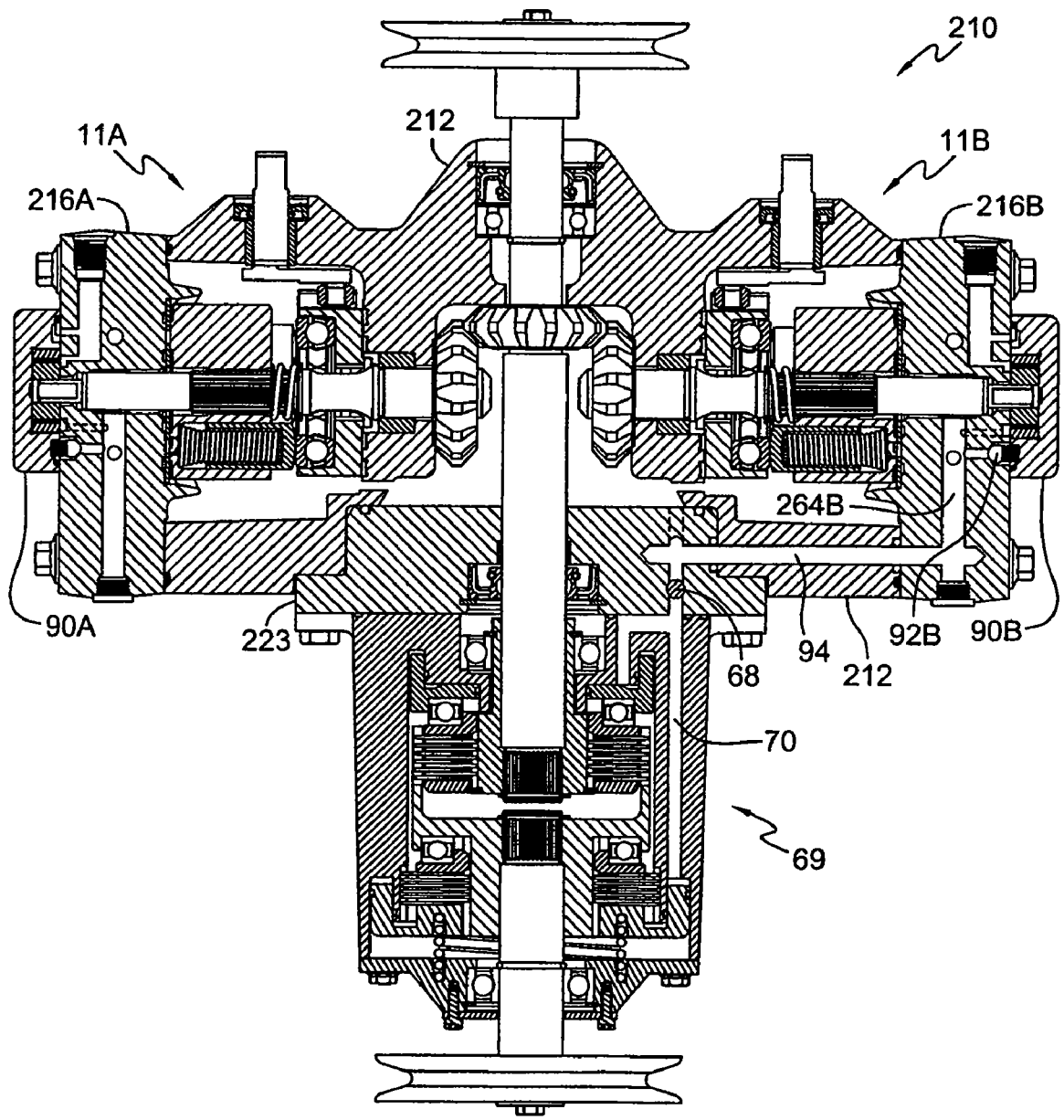
FIG. 6 is a detailed cross-sectional view of a third embodiment of the invention.

FIG. 6 depicts a third embodiment of the present invention, where pump apparatus 210 has two charge pumps 90A and 90B to provide the charge pressure for end caps 216A and 216B as well as actuation pressure for power take off 69. Charge gallery 264B is the source of pressurized hydraulic fluid that is provided via passage 94 to power take off valve 68. Also shown in FIG. 6 is charge pressure relief 92B, which may be located in a variety of locations, but is easier to include in end cap 216B in this embodiment as it minimizes the complexity of machining of cover 223.

Figure 7:
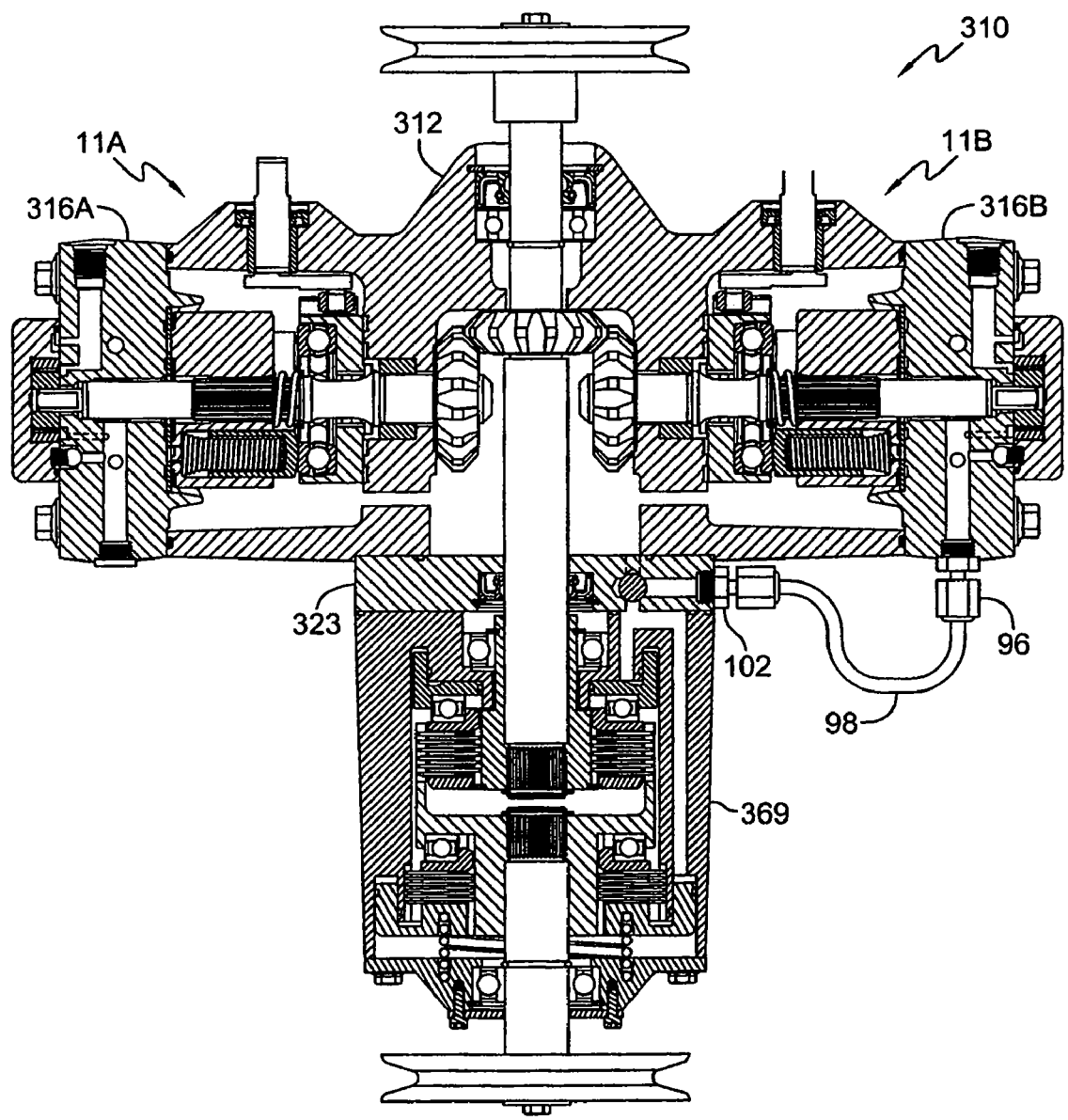
FIG. 7 is a detailed cross-sectional view of a fourth embodiment of the invention.

FIG. 7 depicts a fourth embodiment pump apparatus 310 similar to that shown in FIG. 6, but passageway 94 through housing 212 shown in FIG. 6 has been eliminated, along with the complexity in manufacturing that such a passageway entails. The FIG. 7 embodiment uses a tube or hose 98 connected to end cap 316B by fitting 96 and to cover 323 by fitting 102.

While specific embodiments of the invention have been described in detail, it will be appreciated by those skilled in the art that various modifications and alternatives to those details could be developed in light of the overall teachings of the disclosure. Accordingly, the particular arrangements of the power take off, power take off brake, fluid passages, etc., disclosed are meant to be illustrative only and not limiting as to the scope of the invention which is to be given the full breadth of the appended claims and any equivalents thereof.

What is claimed is:

1. A hydraulic apparatus, comprising:
   an input shaft driven by a prime mover, the input shaft positioned at a first end of the hydraulic apparatus;
   a pair of hydraulic pumps driven by the input shaft, wherein the input shaft is positioned between and drives the hydraulic pumps; and
   a hydraulically actuated power take off unit having an output shaft, the power take off unit positioned at a second end of the hydraulic apparatus, opposite the first end;
   wherein the input shaft and output shaft are collinear.

2. The hydraulic apparatus of claim 1, wherein a charge pump, positioned coaxially with the input shaft, provides pressurized fluid for hydraulic actuation of the power take off unit.

3. The hydraulic apparatus of claim 2, wherein the charge pump is positioned internal to a housing containing the pair of hydraulic pumps.

4. The hydraulic apparatus of claim 3, wherein the charge pump is connected to an external reservoir and filter.

5. The hydraulic apparatus of claim 2, wherein the charge pump is mounted on a component, and a valve for providing pressurized fluid to actuate the power take off unit is mounted within the component.

6. The hydraulic apparatus of claim 1, wherein the power take off unit further comprises a brake, wherein the brake stops movement of the output shaft when the power take off unit is in a non-actuated condition.

7. A charge fluid circuit for a hydraulic apparatus, the charge fluid circuit comprising:
   a charge pump driven by an input shaft;
   a first and a second passage extending from the charge pump, generally perpendicular to the input shaft, to a first hydraulic pump positioned to a first side of the input shaft and to a second hydraulic pump positioned to a second side of the input shaft generally opposite the first side, respectively; and
   a third passage extending from the charge pump to a hydraulically actuated power take off unit.

8. The charge fluid circuit of claim 7, wherein the charge pump is generally coaxial with the input shaft.

9. The charge fluid circuit of claim 7, wherein the charge pump draws fluid from an external reservoir.

10. The charge fluid circuit of claim 7, wherein the input shaft directly drives the charge pump.

11. The charge fluid circuit of claim 7, wherein the power take off comprises an output shaft and a brake, wherein the output shaft is stopped by the brake when hydraulic pressure is released from the hydraulically actuated power take off unit.

12. The charge fluid circuit of claim 7, wherein the third passage is generally parallel to the input shaft and contains a valve for controlling the flow of pressurized fluid to and from the hydraulically actuated power take off unit, and wherein the third passage is connected to a brake and a clutch of the hydraulically actuated power take off unit.

13. The charge fluid circuit of claim 12, wherein the valve alternatively provides pressure to actuate the clutch and release the brake, and removes pressure from the clutch and the brake to permit the brake to stop an output shaft of the hydraulically actuated power take off unit.

14. A hydraulic apparatus, comprising:
   a housing forming a sump;
   a first end cap having hydraulic porting attached to a first end of the housing;
   a first charge pump attached to a portion of the first end cap external to the sump;
   a second end cap having hydraulic porting attached to a second end of the housing;
   a second charge pump attached to a portion of the second end cap external to the sump; and
   a hydraulically actuated power take off attached to a side of the housing;
   wherein pressurized fluid from at least the first charge pump is connected to the hydraulically actuated power take off at least partially by way of a first hydraulic hose, wherein the first hydraulic hose is connected at one end to an external portion of the first end cap, and connected at the other end to the power take off.

15. The hydraulic apparatus of claim 14, further comprising an input shaft, wherein the input shaft is directly connected to the power take off and indirectly connected to the first charge pump and the second charge pump.

16. The hydraulic apparatus of claim 15, wherein the first charge pump and the second charge pump are generally symmetrically disposed opposite each other about the input shaft.

17. The hydraulic apparatus of claim 15, wherein the first charge pump and the second charge pump are positioned to be in mirror symmetry to each other with the input shaft positioned halfway between the first charge pump and the second charge pump.

18. The hydraulic apparatus of claim 15 further comprising a valve that alternatively permits pressurized fluid to actuate the power take off or prevents pressurized fluid from actuating the power take off.

19. The hydraulic apparatus of claim 18, wherein the power take off comprises an output shaft and a brake positioned to stop the output shaft, wherein the output shaft is stopped by the brake when the valve prevents pressurized fluid from actuating the power take off.

20. The hydraulic apparatus of claim 15, wherein the housing is a unitary housing comprising a first opening that is covered by the first end cap, a second opening covered by the second end cap, and a third opening sealed by a cover to which the power take off is connected.

21. The hydraulic apparatus of claim 15, wherein pressurized fluid from the second charge pump is also connected to the hydraulically actuated power take off at least partially by way of a second hydraulic hose, wherein the second hydraulic hose is connected at one end to an external portion of the second end cap, and connected at the other end to the power take off.

\* \* \* \* \*